United States Patent
Albrecht et al.

(10) Patent No.: US 10,572,976 B2
(45) Date of Patent: Feb. 25, 2020

(54) ENHANCING OBSERVATION RESOLUTION USING CONTINUOUS LEARNING

(71) Applicant: International Business Machines Corporation, Armonk, NY (US)

(72) Inventors: Conrad M. Albrecht, White Plains, NY (US); Hendrik F. Hamann, Bedford, NY (US); Siyuan Lu, Yorktown Heights, NY (US); Sharathchandra U. Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 15/786,735

(22) Filed: Oct. 18, 2017

(65) Prior Publication Data
US 2019/0114744 A1 Apr. 18, 2019

(51) Int. Cl.
*G06K 9/32* (2006.01)
*G06T 3/40* (2006.01)
(Continued)

(52) U.S. Cl.
CPC ............ *G06T 3/4053* (2013.01); *G06T 5/003* (2013.01); *G06T 7/45* (2017.01); *G06T 7/55* (2017.01);
(Continued)

(58) Field of Classification Search
CPC ......... G06T 3/4053; G06T 7/45; G06T 5/003; G06T 7/55; G06T 2207/10032;
(Continued)

(56) References Cited

U.S. PATENT DOCUMENTS 5,055,927 A * 10/1991 Keesen ................. H04N 7/122
348/389.1
7,769,241 B2 8/2010 Adams, Jr. et al.
(Continued)

FOREIGN PATENT DOCUMENTS

EP 1096424 A2 5/2001
EP 1582996 A2 10/2005
(Continued)

OTHER PUBLICATIONS

Zhu, Xiaolin et al. "A flexible spatiotemporal method for fusing satellite images with different resolutions", available on line Nov. 21, 2015, pp. 165-177.*
(Continued)

*Primary Examiner* — Samir A Ahmed
(74) *Attorney, Agent, or Firm* — Cantor Colburn LLP; Vazken Alexanian

(57) ABSTRACT

A system and method to enhance observation resolution using continuous learning include obtaining a first image of a surface area from a first satellite, and obtaining a second image of the surface area from a second satellite. The first image has a lower spatial resolution than the second image, and temporal resolution of the first images obtained by the first satellite is higher than temporal resolution of the second images obtained by the second satellite. The method also includes determining a convolution matrix A or training a neural network, obtaining additional one or more of the first images prior to obtaining an additional one of the second images, and generating a new image from each of the one or more of the first images using the convolution matrix A or the neural network. The new image has a higher spatial resolution than the one or more of the first images.

12 Claims, 4 Drawing Sheets

(51) Int. Cl.
 *G06T 5/00* (2006.01)
 *G06T 7/55* (2017.01)
 *G06T 7/45* (2017.01)

(52) U.S. Cl.
 CPC ............... *G06T 2207/10032* (2013.01); *G06T 2207/20016* (2013.01); *G06T 2207/20084* (2013.01); *G06T 2207/30208* (2013.01)

(58) Field of Classification Search
 CPC . G06T 2207/20016; G06T 2207/30208; G06T 2207/20084
 See application file for complete search history.

(56) References Cited

U.S. PATENT DOCUMENTS

| | | | |
|---|---|---|---|
| 8,279,341 B1 | 10/2012 | Bozinovic | |
| 8,682,110 B2 | 3/2014 | Shin et al. | |
| 8,744,218 B2 | 6/2014 | Nakagami et al. | |
| 9,251,565 B2 | 2/2016 | Phan et al. | |
| 2005/0091030 A1 | 4/2005 | Jessee et al. | |
| 2007/0189386 A1* | 8/2007 | Imagawa | G06T 3/0087 375/240.12 |
| 2008/0147381 A1 | 6/2008 | Yu et al. | |
| 2009/0167909 A1* | 7/2009 | Imagawa | G06T 3/4053 348/262 |
| 2009/0238535 A1* | 9/2009 | Robertson | G06T 3/4053 386/335 |
| 2010/0103297 A1* | 4/2010 | Motomura | H04N 5/23232 348/294 |
| 2010/0149381 A1* | 6/2010 | Motomura | H04N 5/2258 348/235 |
| 2010/0174524 A1 | 7/2010 | Koehn | |
| 2012/0057049 A1* | 3/2012 | Imagawa | H04N 5/23232 348/234 |
| 2013/0011078 A1* | 1/2013 | Phan | G06T 3/4053 382/279 |
| 2014/0294294 A1* | 10/2014 | Tsuchiya | G06T 5/003 382/159 |
| 2015/0103919 A1* | 4/2015 | Hattori | H04N 19/124 375/240.25 |
| 2016/0277771 A1* | 9/2016 | Nakagami | H04N 19/70 |
| 2016/0299885 A1 | 10/2016 | Emanuel et al. | |
| 2017/0035298 A1* | 2/2017 | Contijoch | A61B 5/055 |
| 2017/0307714 A1* | 10/2017 | Okell | G01R 33/56366 |

FOREIGN PATENT DOCUMENTS

| | | |
|---|---|---|
| WO | 2008062910 A1 | 5/2008 |
| WO | 2011100573 A1 | 8/2011 |

OTHER PUBLICATIONS

Cannell et al., "Image Enhancement by Deconvolution", Handbook of Biological Confocal Microscopy, Third Edition, 2006, pp. 488-500.

* cited by examiner

ENHANCING OBSERVATION RESOLUTION USING CONTINUOUS LEARNING

BACKGROUND

The present invention relates to satellite images, and more specifically, to enhancing observation resolution using continuous learning.

Images obtained with orbiting satellites are used in numerous applications such as mapping, border control, infrastructure and regional planning, agricultural and environmental monitoring, intelligence gathering, and biodiversity conservation, for example. In satellite imagery, spatial resolution refers to the pixel size of an image representing the surface area being measured, and temporal resolution refers to the amount of time between imagery collection periods for a given surface location. Some satellites can obtain images at the same viewing angle every 5 or 15 minutes while others can only revisit the same viewing angle every 5 or more days, for example. A satellite with relatively high temporal resolution (i.e., one that revisits the same surface location relatively more often) can have relatively low spatial resolution compared with a satellite with relatively lower temporal resolution. Enhancing the observation resolution of the satellite with relatively higher temporal resolution but relatively lower spatial resolution using continuous learning would provide higher spatial resolution at higher temporal resolution.

SUMMARY

Embodiments of the present invention are directed to a method, system, and computer program product to enhance observation resolution using continuous learning. The method includes obtaining a first spatial resolution image of a surface area from a first satellite, and obtaining a second spatial resolution image of the surface area from a second satellite. The first spatial resolution image and the second spatial resolution image are obtained within a specified time period of each other, the first spatial resolution image has a lower spatial resolution than the second spatial resolution image, and temporal resolution of the first spatial resolution images obtained by the first satellite is higher than temporal resolution of the second spatial resolution images obtained by the second satellite. The method also includes determining a convolution matrix A or training a neural network using the first spatial resolution image and the second spatial resolution image, obtaining additional one or more of the first spatial resolution images prior to obtaining an additional one of the second spatial resolution images, and generating a new image from each of the one or more of the first spatial resolution images using the convolution matrix A or the neural network. The new image corresponding with each of the one or more of the first spatial resolution images has a higher spatial resolution than the one or more of the first spatial resolution images.

DETAILED DESCRIPTION

As previously noted, satellites that obtain surface images can have different temporal and spatial resolutions. For example, a satellite that obtains images of the same surface area more frequently (i.e., a satellite with higher temporal resolution) can have lower spatial resolution than a satellite that obtains images less frequently. Yet, higher spatial resolution images at a higher temporal resolution can be beneficial in each of the technical areas in which satellite images are used. Prior approaches to obtaining higher resolution images involve interpolation and the application of an optical flow method. These approaches provide solutions that are fixed rather than continuously improved and that are not necessarily applicable to every type of surface area.

Embodiments of the systems and methods detailed herein relate to enhancing observation resolution using continuous learning. Unlike prior solutions, the embodiments facilitate combining the higher temporal resolution obtained with one satellite coupled and the higher spatial resolution obtained with another satellite. Specifically, continuous learning is performed using lower and higher spatial resolution images of the same surface location. The learning is applied to increase the resolution of the lower spatial resolution images that are obtained more frequently than the higher spatial resolution images. Additional data (e.g., information regarding precipitation accumulation in the hour prior to the satellite image being obtained) can be used in the process of obtaining the higher spatial resolution image. This additional data can be obtained by a different source that either of the satellites.

By increasing the spatial resolution of images that are obtained more frequently (i.e., higher temporal resolution images), the analysis that is facilitated by the images is improved. Thus, the one or more relevant technical areas that analyze the images—e.g., mapping, border control, infrastructure and regional planning, agricultural and environmental monitoring, intelligence gathering, and biodiversity conservation—are improved based on the increased resolution.

Figure 1:
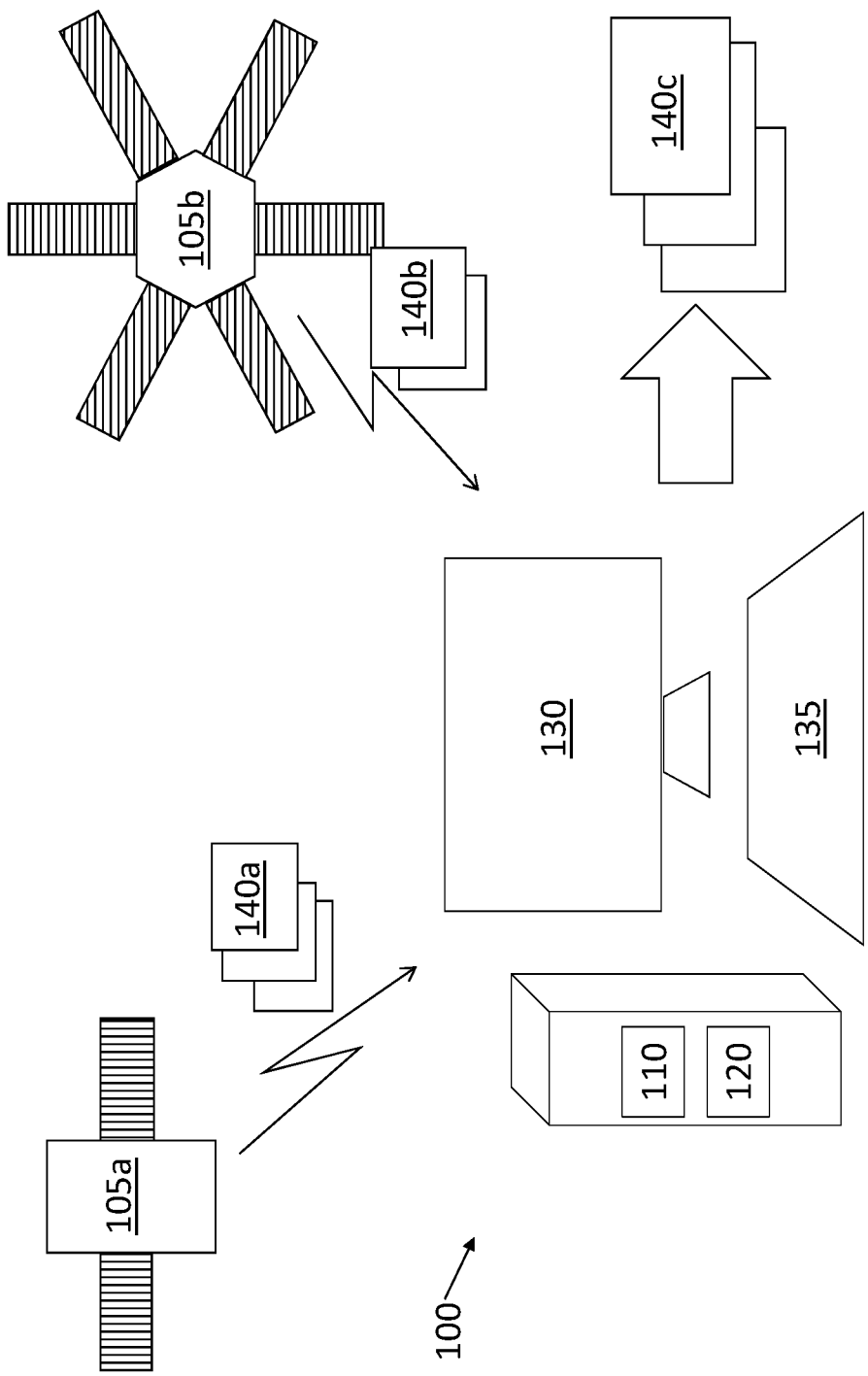
FIG. 1 is a block diagram of a system to enhance observation resolution using continuous learning according to one or more embodiments of the invention.

FIG. 1 is a block diagram of a system 100 to enhance observation resolution using continuous learning according to one or more embodiments of the invention. In the exemplary case shown in FIG. 1, satellites 105*a*, 105*b* (generally referred to as 105) both provide surface images. The satellite 105*a* has a higher temporal resolution than the satellite 105*b* and, thus, obtains the surface images 140*a* more frequently than satellite 105*b*. The satellite 105*b* has a higher spatial resolution than satellite 105*a* and, thus, obtains surface images 140*b* with higher spatial resolution than surface images 140*a*. The system 100 provides images 140*c* with the (higher) temporal resolution of satellite 105*a* and the (higher) spatial resolution of satellite 105*b* through the different embodiments detailed herein.

The system 100 can be implemented as a computer system as shown in the exemplary embodiment of FIG. 1. In addition to other known components of a computer system, the system 100, as shown in FIG. 1, includes one or more processors 110, one or more memory devices 120, one or more output interfaces 130 (e.g., display monitor), and one or more input interfaces 135 (e.g., keyboard). Higher spatial resolution images 140c at the temporal resolution of images 140a from the higher temporal resolution source (satellite 105a in the example shown in FIG. 1) are provided or displayed by the system 100.

Figure 2:
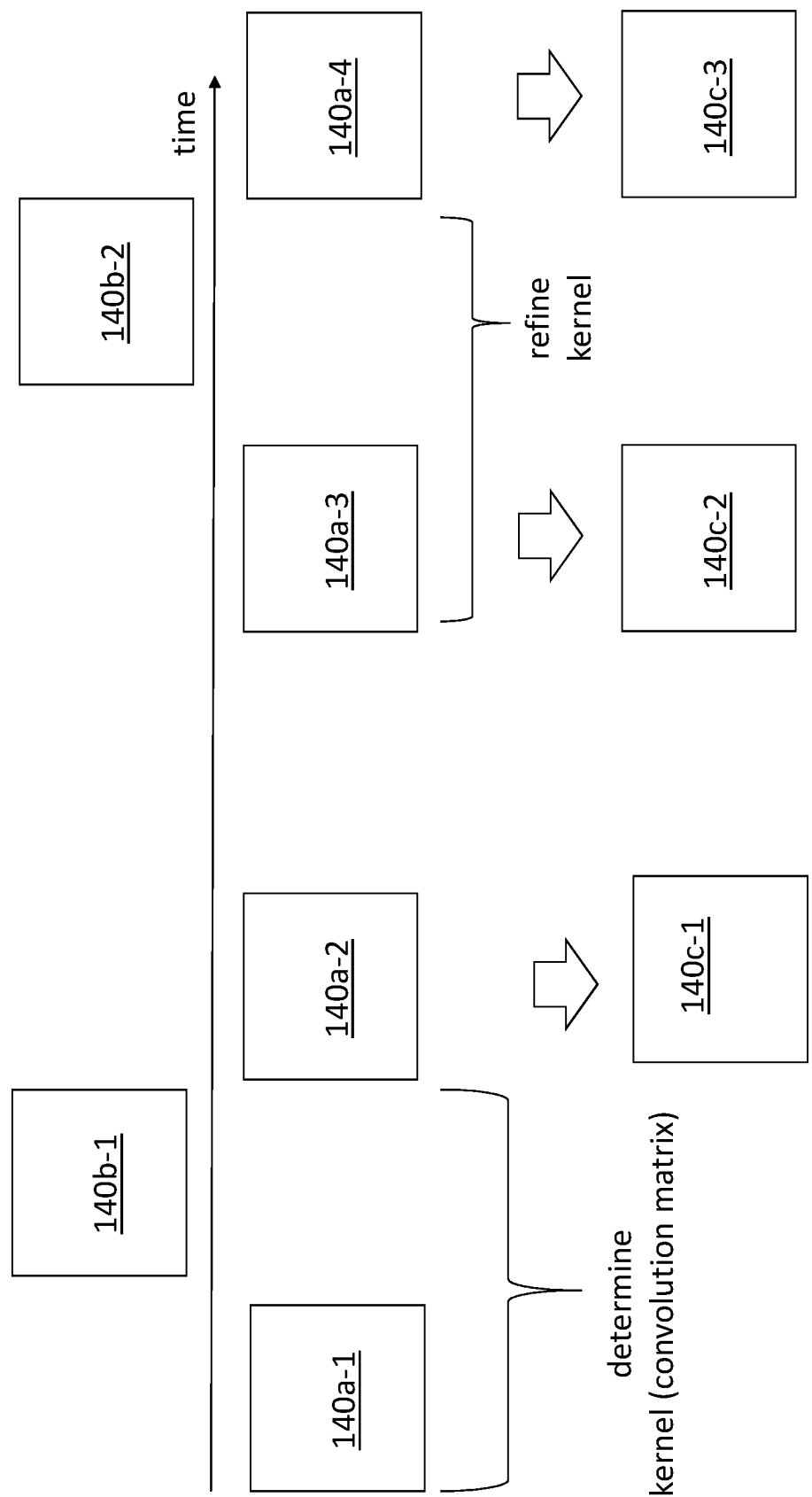
FIG. 2 depicts an exemplary timeline that illustrates the process of enhancing observation resolution using continuous learning according to one or more embodiments.

FIG. 2 depicts an exemplary timeline that illustrates the process of enhancing observation resolution using continuous learning according to an exemplary embodiment of the invention. The exemplary arrangement shown in FIG. 1 is used for explanatory purposes such that high temporal resolution images 140a are obtained by satellite 105a, high spatial resolution images 140b are obtained by satellite 150b, and images 140c with the temporal resolution of images 140a but with higher spatial resolution than images 140a are provided by the system 100. According to the present embodiment, a kernel is determined based on images 140a and 140b and is used to obtain images 140c, as detailed herein.

FIG. 2 shows images 140a-1, 140a-2, 140a-3, and 140a-4 (generally referred to as 140a) that are obtained by satellite 105a, images 140b-1 and 140b-2 (generally referred to as 140b) that are obtained by satellite 105b, and images 140c-1, 140c-2, and 140c-3 (generally referred to as 140c) that are generated by respectively enhancing the spatial resolution of images 140a-2, 140a-3, and 140a-4. The images 140 are shown along a time axis. The spatial resolution of the images 140b-1 and 140b-2 is higher than the spatial resolution of the images 140a-1, 140a-2, 140a-3, and 140a-4, but the temporal resolution of the images 140a-1, 140a-2, 140a-3, and 140a-4 is higher than the temporal resolution of the images 140b-1 and 140b-2. That is, the low spatial resolution images 140a are obtained more frequently than the high spatial resolution images 140b, as indicated along the time axis in FIG. 2. As shown in FIG. 2 and detailed below, a convolution kernel is determined and refined based on a low resolution image 140a and a high resolution image 140b that are obtained within some specified time period of each other and under similar conditions (e.g., weather).

In machine learning and, in particular, in convolutional neural networks (CNNs), an input image or, more generally, a multidimensional data array or matrix, is convolved with a kernel (i.e., convolutional kernel or convolutional matrix) to obtain an output, which can be an output image. A convolution matrix is generated from the kernel as detailed below. The process of convolution can also be referred to as filtering. According to the present embodiment, as FIG. 2 indicates, the images 140a-1 and 140b-1 are used to determine a convolution matrix A such that:

$$A \cdot F = G \quad [EQ. 1]$$

In EQ. 1, the high spatial resolution image 140b-1 is indicated as F, and the low spatial resolution image 140a-1 is indicated as G. Thus, EQ. 1 indicates the convolution matrix A that filters the high spatial resolution image 140b-1 to provide the low spatial resolution image 140a-1. When the next low spatial resolution image 140a-2 is obtained before the next high spatial resolution image 140b-2 is obtained, the convolution matrix A can be used to enhance the spatial resolution of the low spatial resolution image 140a-2. Specifically, a deconvolution of the low spatial resolution image 140a-2 with the convolution matrix A will provide the enhanced spatial resolution image 140c-1, and a deconvolution of the low spatial resolution image 140a-3 with the convolution matrix A will provide the enhanced spatial resolution image 140c-2.

When the next high spatial resolution image 140b-2 is obtained, the convolution matrix A is refined, as indicated in FIG. 2. This means that, when the next low spatial resolution image 140a-4 is obtained, the refined convolution matrix A (i.e., the relearned convolution matrix) can be used to enhance the spatial resolution of the low spatial resolution image 140a-4 and obtain enhanced spatial resolution image 140c-3. The spatial resolution of enhanced spatial resolution image 140c-3 can be improved over that of enhanced spatial resolution image 140c-1 and that of enhanced spatial resolution image 140c-2 based on the refinement of the convolution matrix A. In this way, the continuous learning improves the enhancement of each low resolution image 140a that follows another high spatial resolution image 140b.

The determination of the convolution matrix A is explained with reference to the image 140a-1 being a 4×4 pixel image, the image 140b-1 being a 12×12 pixel image. The image 140a-1 is written as a vector of 16 elements (4*4), and the image 140b-1 is written as a vector of 144 elements (12*12). Thus, the convolution matrix A according to EQ. 1 is 144×16 such that each of the 16 rows of 144 elements of the convolution matrix A are convolved (i.e., linear combination is performed) with the 144 elements of the image 140b-1 to provide one of the 16 elements of the image 140a-1. Of the 144 elements of each of the 16 rows of the convolution matrix A, most of the 144 elements are 0. Only a subset of the 144 elements, corresponding with a kernel H of k×k elements, is non-zero.

The location of the kernel H among the other elements differs for each of the 16 rows (i.e., the kernel H slides along the image 140b-1). In the exemplary case, the kernel H is a 3×3 matrix (i.e., k=3). In this case, 16 equations corresponding with the 16 rows of the convolution matrix A are used to determine 9 elements (3*3) of the kernel H. This greater number of equations (16) than unknowns (9) means that EQ. 1 is an overdetermined equation. Solving for kernel H and, thus, convolution matrix A using images 140a-1 and 140b-1 can be accomplished with known techniques such as a least square fit or QR factorization.

Once the convolution matrix A is obtained or refined, a low resolution image such as image 140a-2 can be deconvolved with the convolution matrix A to obtain a higher resolution image such as image 140c-1. Deconvolution according to a mathematical inversion of EQ. 1 leads to an under-determined set of linear equations. That is, the number of unknowns (144 in the exemplary case discussed herein) is greater than the number of equations (16 in the exemplary case). In addition to known mathematical regularization techniques to solve such equations, the additional data (e.g., precipitation information for the surface area corresponding with the spatial area sensed by the satellites 105a, 105b) can impose additional constraints on the solution of the equations. Accordingly, a physically meaningful objective function can be constructed that constrains EQ. 1 in order to obtain a higher spatial resolution image 140c from a lower spatial resolution image 140a. For example, precipitation information can be used to restrict the variance, absolute value, or both of the values of pixels of the higher resolution image 140c.

In an additional or alternate embodiment, multiple convolution matrices A can be determined and bucketized to correspond with the additional data. For example, the variance of pixel values can be lower during rain than in sun. Thus, a convolution matrix A can be determined, refined, and maintained for rainy weather while other convolution matrices A are maintained for other weather conditions.

Figure 3:
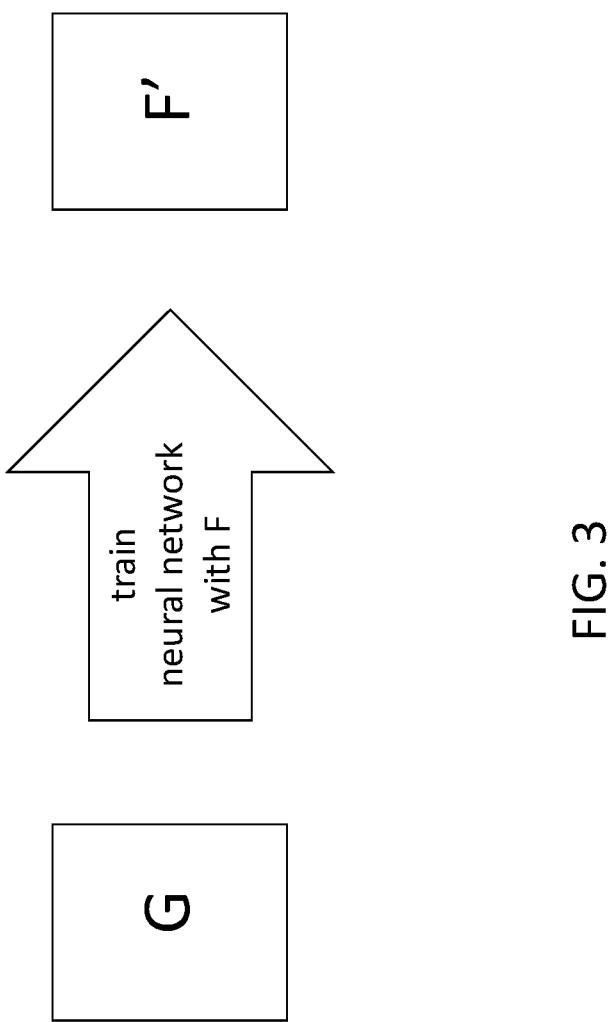
FIG. 3 illustrates a process of obtaining the higher spatial resolution images according to another embodiment of the invention.

FIG. 3 illustrates a process of obtaining the higher spatial resolution images 140c (denoted as F') according to another embodiment of the invention. The process includes training a decoder, an artificial neural network and, more specifically, a CNN, used for unsupervised learning, to generate F' from the lower spatial resolution images 140a (denoted as G). The decoder can be implemented using the system 100. The training process involves using the higher spatial resolution images 140b (denoted as F) to correct the generated F' and can be continuous as additional higher spatial resolution images 140b (F) are obtained. The trained neural network is used to obtain higher spatial resolution images 140c F' at the same temporal resolution as the lower spatial resolution images 140a G.

In additional or alternate embodiments, additional data (e.g., weather-related data) can be used in the process by inputting a three-dimensional matrix to the decoder rather than a two-dimensional image alone. The first two dimensions of the input matrix are unchanged and refer to the geo-spatial dimensions such as, for example, latitude and longitude coordinates defined by the center of the pixels of the lower spatial resolution image 140a G, for example. The third dimension can index the geo-referenced additional data per pixel. For example, when the satellite image (e.g., lower spatial resolution image 140a) has multiple bands of the electromagnetic spectrum (e.g., an image with red, green, and blue information), these bands define the third dimension having three distinct values red, green, and blue. When other data, such as precipitation P or temperature T is available, this data (P and T) can define the third dimension of the input matrix either instead of or in addition to the index values red, green, and blue.

Figure 4:
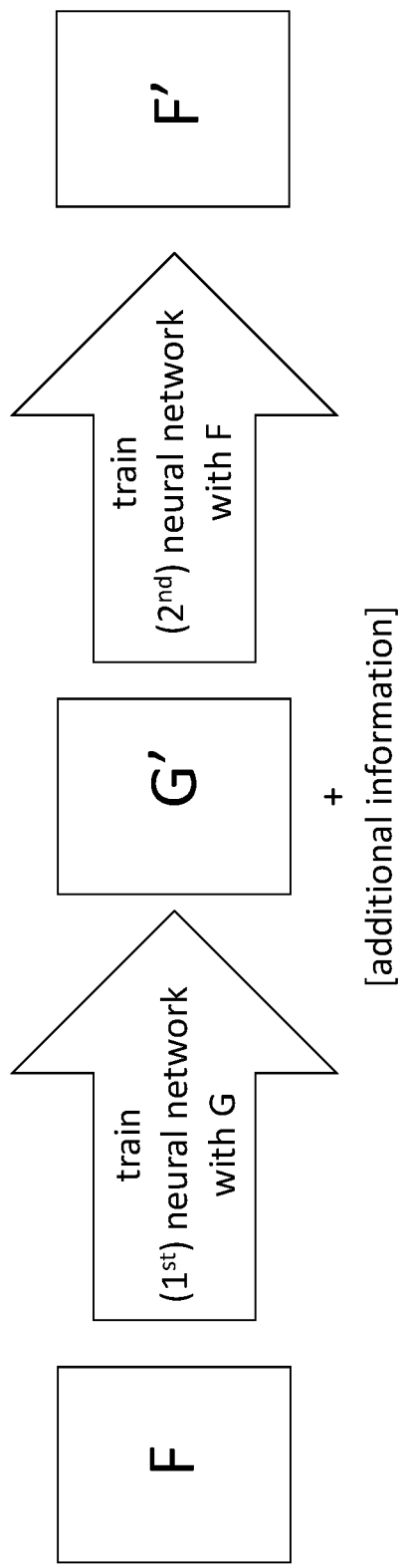
FIG. 4 illustrates a process of obtaining the higher spatial resolution images according to yet another embodiment of the invention.

FIG. 4 illustrates a process of obtaining the higher spatial resolution images 140c (denoted as F') according to yet another embodiment of the invention. The process involves two CNNs that are combined to form what is referred to as an autoencoder. A first neural network, referred to as an encoder, is trained to generate lower spatial resolution images G' from higher spatial resolution images 140b (denoted as F). According to one or more embodiments of the invention, the encoder is trained using obtained lower spatial resolution images 140a (denoted as G) to correct the obtained G'. A second neural network, referred to as the decoder, is trained to generate higher spatial resolution images 140c (denoted as F') from the generated images G'.

Unlike the process discussed with reference to FIG. 3, which uses a single decoder, the process associated with FIG. 4 stacks an encoder and a decoder. The process associated with FIG. 4 also facilitates the inclusion of additional information (e.g., weather). The additional information is incorporated into the generation of the higher spatial resolution image 140c F'. Specifically, the image G' that is generated using the encoder is corrected based on the obtained lower spatial resolution image 140a G (obtained within a time duration of the high spatial resolution image 140b F) and also additional information such as weather-related information. Both the image G' and the additional information become inputs to the decoder with the output higher spatial resolution image 140c F' that gets trained using the high spatial resolution image 140b F. Thus, when a lower spatial resolution image 140a G is obtained, the higher spatial resolution image 140c F' is obtained using both that lower spatial resolution image 140a G and additional information as an input to the second neural network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of enhancing observation resolution using continuous learning, the method comprising:
   obtaining, using a processor, a first spatial resolution image of a surface area from a first satellite;
   obtaining, using the processor, a second spatial resolution image of the surface area from a second satellite, wherein the first spatial resolution image and the second spatial resolution image are obtained within a specified time period of each other, the first spatial resolution image has a lower spatial resolution than the second spatial resolution image, and temporal resolution of the first spatial resolution images obtained by the first satellite is higher than temporal resolution of the second spatial resolution images obtained by the second satellite;
   determining, using the processor, training a neural network using the first spatial resolution image and the second spatial resolution image;
   obtaining, by the processor, additional one or more of the first spatial resolution images prior to obtaining an additional one of the second spatial resolution images; and
   generating, using the processor, a new image from each of the one or more of the first spatial resolution images using the convolution matrix A or the neural network, wherein the new image corresponds with each of the one or more of the first spatial resolution images, the new image has a higher spatial resolution than the one or more of the first spatial resolution images, and the training the neural network includes training a first neural network to generate an estimate of the first spatial resolution image from the second spatial resolution image and training a second neural network to generate the new image from the estimate of the first spatial resolution image.

2. The method according to claim 1, further comprising refining the neural network using the additional one of the second spatial resolution images.

3. The method according to claim 1, wherein the training the neural network includes training the neural network to generate one of the new images from each of the one or more of the first spatial resolution images based on using the second spatial resolution image during the training.

4. The method according to claim 1, further comprising including weather information as an input to the second neural network, wherein the generating the new image from each of the one or more of the first spatial resolution images includes using each of the one or more of the first spatial resolution images and corresponding weather information as the input to the second neural network.

5. A system to enhance observation resolution using continuous learning, the system comprising:
   an input interface configured to obtain a first spatial resolution image of a surface area from a first satellite and a second spatial resolution image of the surface area from a second satellite, wherein the first spatial resolution image and the second spatial resolution image are obtained within a specified time period of each other, the first spatial resolution image has a lower spatial resolution than the second spatial resolution image, and temporal resolution of the first spatial resolution images obtained by the first satellite is higher than temporal resolution of the second spatial resolution images obtained by the second satellite; and a processor configured to train a neural network using the first spatial resolution image and the second spatial resolution image, obtain additional one or more of the first spatial resolution images prior to obtaining an additional one of the second spatial resolution images, and generate a new image from each of the one or more of the first spatial resolution images using the convolution matrix A or the neural network, wherein the new image corresponds with each of the one or more of the first spatial resolution images, the new image has a higher spatial resolution than the one or more of the first spatial resolution images, and the processor trains the neural network based on training a first neural network to generate an estimate of the first spatial resolution image from the second spatial resolution image and training a second neural network to generate the new image from the estimate of the first spatial resolution image.

6. The system according to claim 5, wherein the processor refines the neural network using the additional one of the second spatial resolution images.

7. The system according to claim 5, wherein the processor trains the neural network based on training the neural network to generate one of the new images from each of the one or more of the first spatial resolution images based on using the second spatial resolution image during the training.

8. The system according to claim 5, wherein the processor includes weather information as an input to the second neural network, wherein the processor generates the new image from each of the one or more of the first spatial resolution images based on using each of the one or more of the first spatial resolution images and corresponding weather information as the input to the second neural network.

9. A computer program product for enhancing observation resolution using continuous learning, the computer program product comprising a computer readable storage medium having program instructions embodied therewith, the program instructions executable by a processor to perform a method comprising:

obtaining a first spatial resolution image of a surface area from a first satellite;

obtaining a second spatial resolution image of the surface area from a second satellite, wherein the first spatial resolution image and the second spatial resolution image are obtained within a specified time period of each other, the first spatial resolution image has a lower spatial resolution than the second spatial resolution image, and temporal resolution of the first spatial resolution images obtained by the first satellite is higher than temporal resolution of the second spatial resolution images obtained by the second satellite;

training a neural network using the first spatial resolution image and the second spatial resolution image;

obtaining additional one or more of the first spatial resolution images prior to obtaining an additional one of the second spatial resolution images; and generating a new image from each of the one or more of the first spatial resolution images using the convolution matrix A or the neural network, wherein the new image corresponds with each of the one or more of the first spatial resolution images, the new image has a higher spatial resolution than the one or more of the first spatial resolution images, and the training the neural network includes training a first neural network to generate an estimate of the first spatial resolution image from the second spatial resolution image and training a second neural network to generate the new image from the estimate of the first spatial resolution image.

10. The computer program product according to claim 9, further comprising refining the neural network using the additional one of the second spatial resolution images.

11. The computer program product according to claim 9, wherein the training the neural network includes training the neural network to generate one of the new images from each of the one or more of the first spatial resolution images based on using the second spatial resolution image during the training.

12. The computer program product according to claim 9, wherein the training the second neural network includes adding weather information as an input to the second neural network, and the generating the new image from each of the one or more of the first spatial resolution images includes using each of the one or more of the first spatial resolution images and corresponding weather information as the input to the second neural network.

* * * * *